(12) United States Patent
Tamezane et al.

(10) Patent No.: US 6,187,473 B1
(45) Date of Patent: Feb. 13, 2001

(54) CYLINDRICAL ALKALINE STORAGE BATTERY AND MANUFACTURING METHOD OF THE SAME

(75) Inventors: Shigeto Tamezane, Mihara-gun; Takaaki Ikemachi; Takashi Yamaguchi, both of Tsuna-gun; Satoshi Narukawa, Sumoto, all of (JP)

(73) Assignee: Sanyo Electric Co., Ltd. (JP)

( * ) Notice: Under 35 U.S.C. 154(b), the term of this patent shall be extended for 0 days.

(21) Appl. No.: 09/195,446

(22) Filed: Nov. 18, 1998

(30) Foreign Application Priority Data

Nov. 18, 1997 (JP) ..................................... 9-317492

(51) Int. Cl.⁷ ..................................... H01M 6/10
(52) U.S. Cl. ..................... 429/164; 429/161; 429/94; 429/206; 429/211; 429/241; 429/242; 429/244
(58) Field of Search ............... 429/94, 164, 241, 429/242, 244, 206, 211, 161

(56) References Cited

U.S. PATENT DOCUMENTS

| | | | |
|---|---|---|---|
| 4,332,867 | * | 6/1982 | Tsuda et al. ............... 429/94 |
| 4,707,421 | * | 11/1987 | Mc Veigh, Jr. et al. ............ 429/94 |
| 5,542,958 | * | 8/1996 | Furukawa ..................... 29/623.1 |

FOREIGN PATENT DOCUMENTS

| | | |
|---|---|---|
| 61-218067 | 9/1986 | (JP) . |
| 62-139251 | 6/1987 | (JP) . |
| 64-71064 | 3/1989 | (JP) . |

* cited by examiner

Primary Examiner—Stephen Kalafut
Assistant Examiner—Angela J. Martin
(74) Attorney, Agent, or Firm—Nixon & Vanderhye PC

(57) ABSTRACT

A cylindrical alkaline storage battery including a spiraled electrode body composed of a pair of opposed electrodes spirally rolled up through a separator and coupled within a cylindrical casing, at least one of the electrodes being in the form of a non-sintered type electrode composed of an active material retention substrate of three dimensionally meshed structure impregnated with paste of an active material, and a current collector formed with a disc portion for connection to one end portion of the non-sintered type electrode and a lead portion for connection to a terminal, wherein the one end portion of the non-sintered type electrode is formed without impregnation of the paste of the active material, and wherein a perforated sheet metal welded to the one end portion of the non-sintered type electrode is welded at its side edge to the disc portion of the current collector.

3 Claims, 4 Drawing Sheets

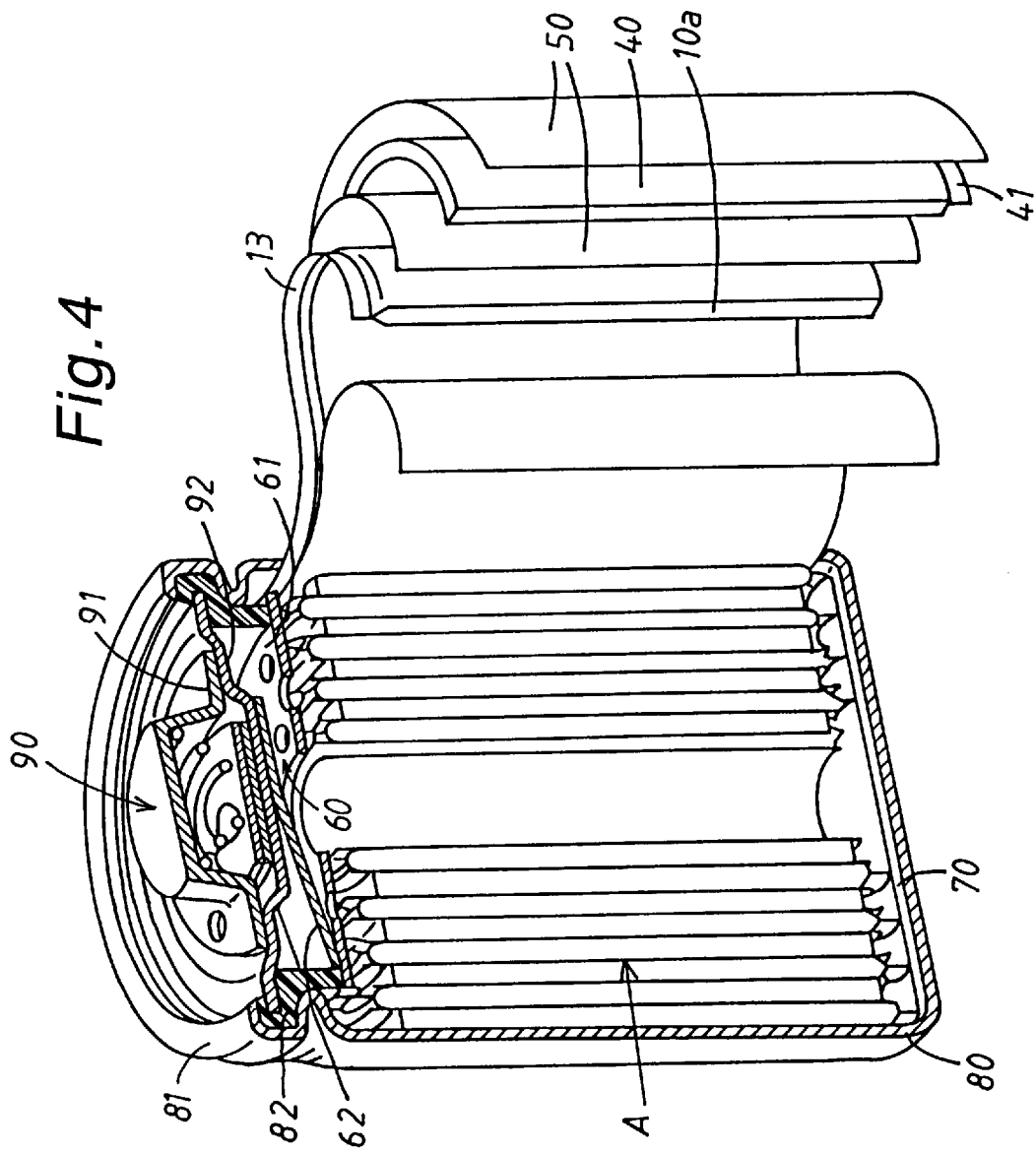

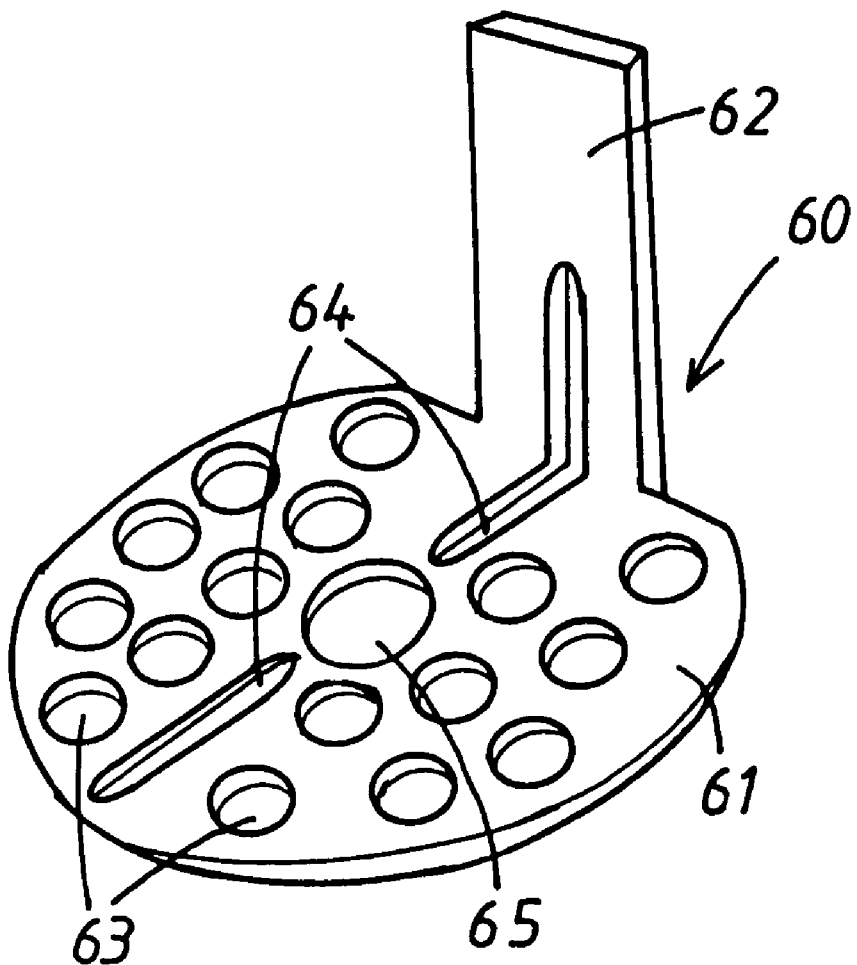

CYLINDRICAL ALKALINE STORAGE BATTERY AND MANUFACTURING METHOD OF THE SAME

BACKGROUND OF THE INVENTION

1. Field of the Invention

The present invention relates to a cylindrical alkaline storage battery such as a nickel-hydrogen battery, a nickel-cadmium battery, a nickel-zinc battery in the like, and more particularly to an improvement of a conductive connection between a current collector and an electrode in the form of an active material retention substrate impregnated with an active material.

2. Discussion of the Prior Art

An electrode for use in a conventional alkaline storage battery such as a nickel-cadmium battery, a nickel-hydrogen battery, a nickel-zinc battery or the like is in the form of a sintered type electrode fabricated by the steps of sintering nickel powder on a perforated core substrate such as a punched sheet metal to produce a sintered base plate, impregnating the sintered base plate with solution of nickel and cadmium salts and subjecting the base plate to alkali treatment for activation. In case a sintered base plate of high porosity was used for fabrication of the sintered type electrode, the mechanical strength of the electrode would be weakened. For this reason, a sintered base plate of about 80% porosity is used for fabrication of the electrode in practical use. In addition, use of the perforated core substrate results in a decrease of impregnation density of the active material and difficulty for fabrication of an electrode of high energy density. Since the pore of the sintered base plate is less than 10 µm, to the impregnation process of the active material must be resealed by a solution impregnation method or an electrodepositive impregnation method. This results in an increase in the manufacturing cost of the batteries.

To avoid the problems described above, a non-sintered type electrode has been used, which is fabricated by directly impregnating paste of an active material into a porous metal substrate or an active material retention substrate of three dimensionally meshed structure such as a sintered substrate of metal fiber, foam nickel or nickel sponge. Since the porosity of the porous metal substrate of three dimensionally meshed structure is about 95%, the porous metal substrate can be impregnated with the active material of high density for manufacturing a battery of large capacity in a simple manner without a treatment for activation.

As the non-sintered type electrode of this kind does not include any core substrate, various methods have been proposed for conductive connection of the battery terminal with the electrode in the form of the porous metal substrate impregnated with the active material. For example, disclosed in Japanese Patent Laid-open Publication No. 61-218067 is a manufacturing method of an electrode the retention substrate of which is in the form of a sintered felt-like substrate of metal fiber. During the manufacturing process of the electrode, a felt-like plate of metal fiber is integrally formed with a conductive ancillary substrate such as a meshed substrate, a punched sheet metal, a wire material or a flat plate to enhance the mechanical strength of the felt-like plate of metal fiber and the current collectivity of the electrode.

However, as the sintered substrate of metal fiber is made of fine metal fibers of about 10 µm in diameter bundled in a longitudinal direction of the electrode, the fine metal fibers are disconnected when the sintered substrate of metal fiber is spirally rolled up through a separator after being coated with the active material. As a result, the positive and negative electrodes are electrically connected by fragments of the metal fibers that pierce the separator, resulting in the occurrence of a short circuit in the battery.

In the electrode fabricated by using the substrate of foam nickel, the foam nickel itself is prevented from disconnection even when the electrode is spirally rolled up through the separator after being impregnated with the active material. In this case, the active material of the electrode is peeled off to expose the foam nickel, and a current collector tab is welded to the exposed portion of the foam nickel for current collection. In such construction of the electrode, however, voltage drop will occur at the current collector tab when a large amount of current is discharged.

Disclosed in Japanese Patent Laid-open Publication No. 62-139251 is a nickel-cadmium battery fabricated by the steps of compressing one end portion of an electrode substrate made of foam nickel in its width direction to form a dense layer without impregnation of any active material and welding the dense layer to a circular lead plate placed perpendicularly to the electrode surface. In the electrode of the nickel-cadmium battery, the electrode substrate made of foam nickel itself is prevented from disconnection even when the electrode is spirally rolled up through a separator, and the current collectivity at the compressed one end of the electrode substrate welded to the circular lead plate is enhanced. However, as the dense layer formed by compressing the one end portion of the electrode substrate in its width direction is inferior in elasticity, the dense layer is partly broken when the electrode is spirally rolled up through the separator. As a result, a short circuit in the battery will occur due to burrs of the dense layer that pierce the separator. If the dense layer is mixed with an elastic portion of the electrode, it becomes difficult to spirally roll up positive and negative electrodes under uniform pressure.

It has been also proposed to form one end portion of the substrate of foam nickel without impregnation of any active material thereby to fabricate an electrode by welding a ribbon-like sheet metal on the one end portion of the substrate. However, when the electrode is spirally rolled up with an opposed electrode through a separator, a portion -of the sheet metal is folded and brought into contact with the opposed electrode to cause a short circuit in the battery.

SUMMARY OF THE INVENTION

It is, therefore, a primary object of the present invention to provide a cylindrical alkaline storage battery in which a porous metal substrate of three dimensionally meshed structure is used as an active material retention substrate for an electrode of the battery to enhance the current collectivity of the electrode without causing an unexpected short circuit in the battery.

According to the present invention, there is provided a cylindrical alkaline storage battery including a cylindrical casing, a pair of opposed electrodes spirally rolled up through a separator and coupled within the cylindrical casing, at least one of the electrodes being in the form of a non-sintered type electrode composed of an active material retention substrate of three dimensionally meshed structure impregnated with paste of an active material, and a current collector formed with a disc portion for connection to one end portion of the non-sintered type electrode and a lead portion for connection to a terminal, wherein the one end portion of the non-sintered type electrode is formed without impregnating the paste of the active material therewith, and wherein a perforated sheet metal welded to the one end portion of the non-sintered type electrode is welded at its side edge to the disc portion of the current collector.

In a practical embodiment, the perforated sheet metal may be either one of a punched sheet metal or an expanded sheet metal. Preferably, either one of the punched sheet metal or the expanded sheet metal is formed with a side edge cut along its perforated portion and welded to the disc portion of the current collector.

According to an aspect of the present invention, there is provided a manufacturing method of a cylindrical alkaline storage battery comprising the steps of impregnating an active material retention substrate of three dimensionally meshed structure with paste of an active material to prepare a non-sintered type electrode, rolling up the non-sintered type electrode with an opposed electrode through a separator to form a spiraled electrode body, connecting one end portion of the non-sintered type electrode to a disc portion of a current collector, wherein the manufacturing method is characterized by the steps of forming one end portion of the active material retention substrate without impregnating the paste of the active material therewith, welding a perforated sheet metal to the one end portion of the active material retention substrate to prepare the non-sintered type electrode, rolling up the non-sintered type electrode with the opposed electrode through the separator to form the spiraled electrode body, and welding a side edge of the perforated sheet metal to the disc portion of the current collector.

According to another aspect of the present invention, there is provided a manufacturing method of a cylindrical alkaline storage battery comprising the steps of impregnating an active material retention substrate of three dimensionally meshed structure with paste of an active material, removing the impregnated paste of the active material from one end portion of the substrate, welding a perforated sheet metal to the one end portion of the substrate to prepare a non-sintered type electrode, rolling up the non-sintered type electrode with an opposed electrode through a separator to form a spiraled electrode body, welding the perforated sheet metal at its side edge to a disc portion of a current collector.

In a practical embodiment of the present invention, it is preferable that the step of removing the impregnated active material comprises the step of applying ultrasonic vibration to the one end portion of the active material retention substrate for removing therefrom the paste of the active material.

According to a further aspect of the present invention, there is provided a manufacturing method of a cylindrical alkaline storage battery comprising the steps of masking one end portion of an active material retention substrate of three dimensionally meshed structure with an adhesive tape, impregnating the active material retention substrate with paste of an active material, removing the adhesive tape from the one end portion of the substrate, welding a perforated sheet metal to the one end portion of the substrate formed without impregnation of the active material to prepare a non-sintered type electrode, rolling up the non-sintered type electrode with an opposed electrode through a separator to form a spiraled electrode body, and welding the perforated sheet metal at its side edge to a disc portion of a current collector.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 4 is an illustration of a vertical section of a cylindrical nickel-hydrogen storage battery in accordance with the present invention; and FIG. 5 is a perspective view of a current collector for a positive electrode.

DESCRIPTION OF THE PREFERRED EMBODIMENT

Preferred embodiments of a cylindrical alkaline storage battery manufactured by using a non-sintered type electrode according to the present invention will be described hereinafter.

1. Manufacture of a Nickel Positive Electrode

EXAMPLE 1

90 weight part of nickel hydroxide, 5 weight part of metal cobalt powder and 5 weight part of cobalt hydroxide powder were mixed and kneaded with 1 wt. % methyl cellulose and 20 weight part of aqueous solution to prepare paste of an active material. The paste of active material was impregnated in an active material retention substrate made of foam nickel or nickel sponge of 600 g/m$^2$ in areal density and 1.5 mm in thickness. Thereafter, the active material retention substrate 10 was dried and rolled under pressure in thickness of about 0.7 mm. In this instance, the active material retention substrate was impregnated with the paste of active material in such a manner that the impregnation density of the active material becomes about 2.9 to 3.05 g/cc—void after rolled under pressure.

At the following step, an ultrasonic horn (not shown) was pressed into contact with an upper end portion 12 of the active material retention substrate 10 impregnated with the paste of active material 11 to apply ultrasonic vibration perpendicularly to the surface of the upper end portion 12 thereby to remove the impregnated active material 11 from the active material retention substrate 10. In this instance, the upper end portion 12 of substrate 10 was compressed by the ultrasonic vibration and was formed as a compressed thin portion.

Figure 1:
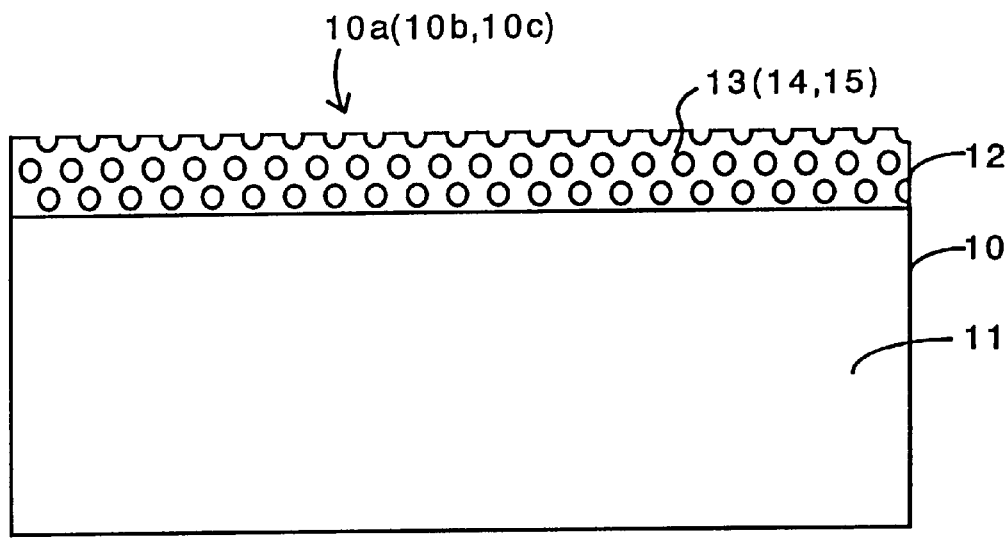
FIG. 1 is a front view of an active material retention substrate made of foam nickel and a perforated sheet metal such as a punched sheet metal welded to an upper end portion of the substrate formed without impregnation of any active material.

On the other hand, as shown in FIG. 1, a nickel sheet metal of 0.06 mm in thickness was punched to form a large number of circular holes in diameter of 0.30 to 1.00 mm alternately at each line thereby to prepare a punched nickel sheet metal 13 the perforation degree of which was determined to be 20 to 60%. The punched nickel sheet metal 13 was cut in width of 1.5 mm in such a manner that the circular holes are cut at each center thereof.

The punched nickel sheet metal 13 was placed on the upper end portion 12 of active material retention substrate 10 in such a manner that the cut portions of the circular holes are slightly projected from the upper edge of substrate 10, In such a condition, the nickel sheet metal 13 was welded to the upper end portion 12 of substrate 10 at an interval of 2 mm by using a copper welding rod of 1.5 mm in diameter to produce a nickel positive electrode 10a provided with the punched nickel sheet metal 13 the cut portion of which is partly projected from the upper edge of substrate 10.

EXAMPLE 2

The same active material retention substrate 10 as that in Example 1 was impregnated with paste of an active material 11 prepared in the same manner as in Example 1. Thereafter, the ultrasonic horn (not shown) was pressed into contact with an upper end portion 12 of active material retention substrate 10 to apply ultrasonic vibration perpendicularly to the surface of upper end portion 12 thereby to remove the impregnated active material 11 from the active material retention substrate 10. In this instance, the upper end portion 12 of substrate 10 was compressed by the ultrasonic vibration and was formed as a compressed thin portion.

On the other hand, as shown in FIG. 1, a nickel sheet metal of 0.10 mm in thickness was punched to form a large number of circular holes in diameter of 0.30 to 1.00 mm alternately at each line thereby to prepare a punched nickel sheet metal 14 the perforation degree of which was determined to be 20 to 60%. The punched nickel sheet metal 14 was cut in width of 1.5 mm in such a manner that the circular holes are cut at each center thereof.

Thus, the punched nickel sheet metal 14 was placed on the upper end portion 12 of active material retention substrate 10 in such a manner that the cut portions of the circular holes are slightly projected from the upper edge of substrate 10, In such a condition, the punched nickel sheet metal 14 was welded to the upper end portion 12 of substrate 10 at an interval of 2 mm by using the copper welding rod of 1.5 mm in diameter to produce a nickel positive electrode plate 10b provided with the punched nickel sheet metal 14 the cut portion of which is partly projected from the upper edge of substrate 10.

EXAMPLE 3

The same active material retention substrate 10 as that in Example 1 was impregnated with paste of an active material 11 prepared in the same manner as in Example 1. Thereafter, the ultrasonic horn (not shown) was pressed into contact with an upper end portion 12 of active material retention substrate 10 to apply ultrasonic vibration perpendicularly to the surface of upper end portion 12 thereby to remove the impregnated active material 11 from the active material retention substrate 10. In this instance, the upper end portion 12 of substrate 10 was compressed by the ultrasonic vibration and was formed as a compressed thin portion.

On the other hand, as shown in FIG. 1, a nickel sheet metal of 0.18 mm in thickness was punched to form a large number of circular holes in diameter of 0.30 to 1.00 mm alternately at each line thereby to prepare a punched nickel sheet metal 15 the perforation degree of which was determined to be 20 to 60%. The punched nickel sheet metal 15 was cut in width of 1.5 mm in such a manner that the circular holes are cut at each center thereof.

Thus, the punched nickel sheet metal 15 was placed on the upper end portion 12 of active material retention substrate 10 in such a manner that the cut portions of the circular holes are slightly projected from the upper edge of substrate 10, In such a condition, the punched nickel sheet metal 15 was welded to the upper end portion 12 of substrate 10 at an interval of 2 mm by using the copper welding rod of 1.5 mm in diameter to produce a nickel positive electrode plate 10c provided with the punched nickel sheet metal 15 the cut portion of which is partly projected from the upper edge of substrate 10.

Comparative Example 1

The same active material retention substrate 20 as that in Example 1 was impregnated with paste of an active material 21 prepared in the same manner as in Example 1. Thereafter, the ultrasonic horn (not shown) was pressed into contact with an upper end portion 22 of active material retention substrate 20 to apply ultrasonic vibration perpendicularly to the surface of upper end portion 22 thereby to remove the impregnated active material 21 from the active material retention substrate 20. In this instance, the upper end portion 22 of substrate 20 was compressed by the ultrasonic vibration and was formed as a compressed thin portion.

Figure 2:
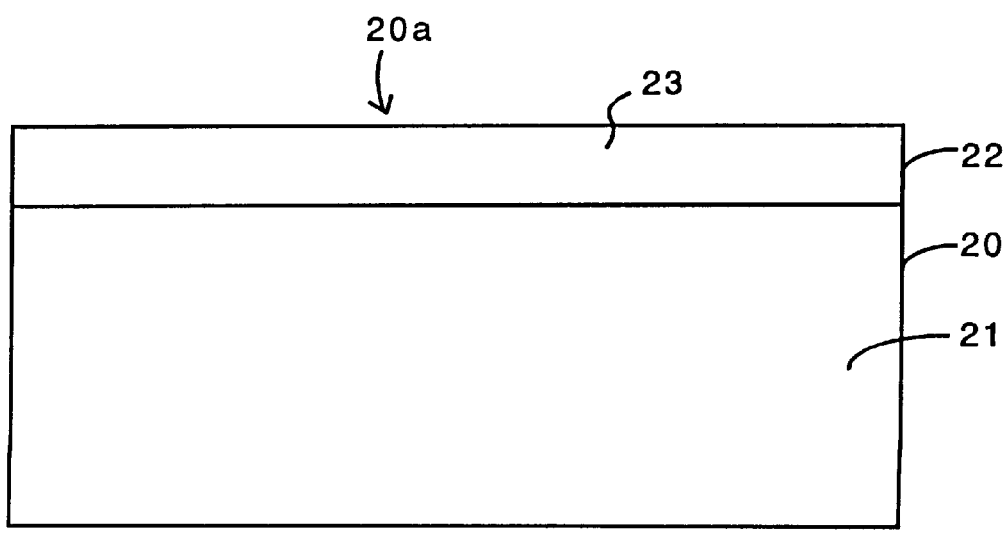
FIG. 2 is a front view of an active material retention substrate made of foam nickel and a conventional sheet metal welded at an upper end portion of the substrate formed without impregnation of any active material.

On the other hand, as shown in FIG. 2, a nickel sheet metal 23 of 0.10 mm in thickness was cut in width of 1.5 mm and placed on the compressed thin portion of retention substrate 20. In such a condition, the nickel sheet metal 23 was welded to the upper end portion 22 of retention substrate 20 at an interval of 2 mm by using the copper welding rod of 1.5 mm in diameter to produce a nickel positive electrode plate 20a as a comparative example 1.

Comparative Example 2

The same active material retention substrate 30 as that in Example 1 was impregnated with paste of an active material 31 prepared in the same manner as in Example 1. Thereafter, an ultrasonic horn (not shown) was pressed into contact with an upper end central portion 32 of active material retention substrate 30 to apply ultrasonic vibration perpendicularly to the surface of upper end central portion 32 thereby to remove the impregnated active material 31 from the active material retention substrate 30. In this instance, the upper end central portion 32 of substrate 30 was compressed by the ultrasonic vibration and was formed as a compressed thin portion.

Figure 3:
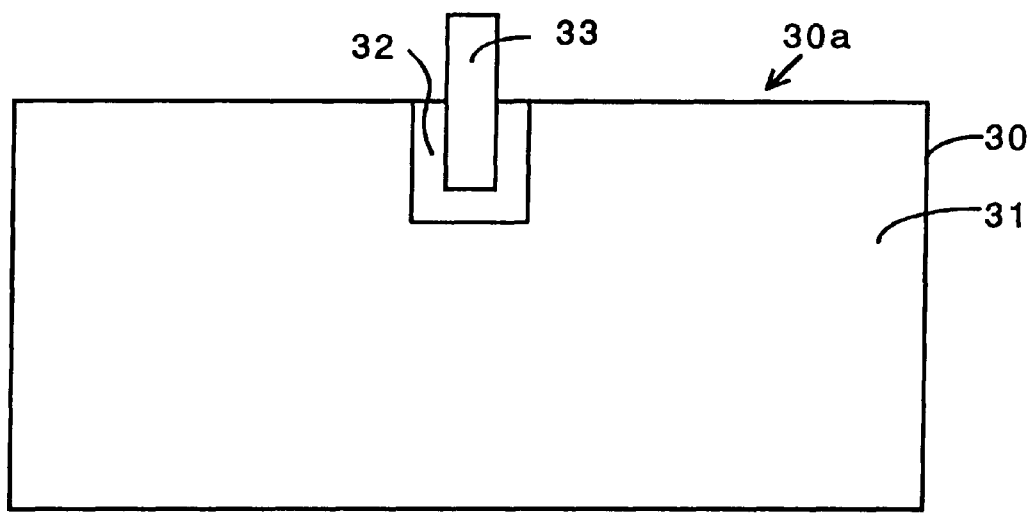
FIG. 3 is a front view of an active material retention substrate made of foam nickel and a conventional current collector tab welded to an upper end portion of the substrate formed without impregnation of any active material.

Thus, as shown in FIG. 3, a rectangular current collector tab 33 made of a nickel sheet metal of 3.0 mm in width and 0.10 mm in thickness was placed on the compressed thin portion 32 of substrate 30. In such a condition, the current collector tab 33 was welded to the compressed thin portion 32 of substrate 30 by using a copper welding rod of 3.0 in diameter and covered with a tape of polypropylene adhered thereto to produce a nickel positive electrode plate 30a as a comparative example 2.

Manufacture of Nickel-Hydrogen Storage Battery:

a) Nickel-hydrogen storage batteries using the nickel positive electrode plates of the Examples 1 to 3:

The nickel positive electrode plates 10a, 10b and 10c each were used to manufacture a nickel-hydrogen storage battery in such a manner as described hereinafter. In the manufacturing process of the battery, a negative electrode plate 41 shown in FIG. 4 was fabricated by coating a punched sheet metal with a hydrogen storage alloy material. Thus, the nickel positive electrode plates 10a, 10b and 10c each were spirally rolled up with the negative electrode plate 41 through a separator 50 made of unwoven polypropylene fabric in such a manner that the negative electrode 41 is located outside. Thus, a spiraled electrode body A was prepared.

On the other hand, a positive current collector 60 of nickel metal was prepared as shown in FIG. 5. The positive current collector 60 has a disc portion 61 and a rectangular lead portion 62. The disc portion 61 of positive current collector 60 is formed with a plurality of openings 63, a pair of diametrically opposed slits 64 for positioning a pair of welding electrodes and a center hole 65 for entry of electrolyte. Similarly, a disc-like negative current collector 70 of nickel metal was prepared.

As shown in FIG. 4, the positive current collector 60 was welded at its disc portion 61 to an upper side edge of the punched sheet metal 13 of the nickel positive electrode plates 10a, while the negative current collector 70 was welded to a bottom end 41 of the negative electrode plate 40. During the welding process, a pair of welding electrodes were positioned in place by engagement with the slits 64 of current collector 60 and applied with a welding current so that the disc portion 61 of current collector 60 is welded to the upper side edge of punched sheet metal 13 by the welding current applied at its bottom surface. In this instance, the projections formed on the upper side edge of punched sheet metal 13 cause the welding current to concentrate into the peripheries of openings 63 of current collector 60 retained in engagement therewith.

After the current collectors 60 and 70 were welded to the positive and negative electrodes 10a and 40, the spiraled electrode body A was coupled within a bottomed cylindrical casing 80, and one of the welding electrodes was inserted into a cylindrical space in the spiraled electrode body A through the center hole 65 of current collector 60 and engaged with the negative current collector 70. In such a condition, the other welding electrode was engaged with the bottom of casing 80 and applied with the welding current to weld the negative current collector 70 to the bottom of casing 80.

At the following step, a cover plate 92 of a closure cap assembly 90 was brought into engagement with and welded to the lead portion 62 of positive current collector 60. In FIG. 4, the reference numeral 91 designates a positive electrode cap welded to the cover plate 92. Thereafter, the cylindrical casing 80 was filled with electrolyte such as aqueous solution of 30 wt.% potassium hydroxide (KOH) supplied through the center hole 65 of positive current collector 60, and the cover plate 92 of closure cap assembly 90 was coupled within an opening end 81 of casing 80 through an annular gasket 82 and secured in place by caulking the opening end 81 of casing 80 to seal the interior of casing 80. Thus, a nickel hydrogen storage battery of nominal capacity 2700 mAH was manufactured by using the nickel positive electrodes of the Examples 1 to 3.

b) Nickel-Hydrogen Storage Battery Using the Nickel Positive Electrode of the Comparative Example 1:

The nickel positive electrodes 20a was used to manufacture a nickel-hydrogen storage battery in such a manner as described hereinafter. In the manufacturing process of the battery, a negative electrode plate 40 was fabricated by coating a punched sheet metal 41 with a hydrogen storage alloy material, and the nickel positive electrode plate 20a of the comparative example 1 was spirally rolled up with the negative electrode plate 40 through a separator 50 made of unwoven polypropylene fabric in such a manner that the negative electrode plate 40 is located outside. Thus, a spiraled electrode body A was prepared.

On the other hand, positive and negative current collectors 60 and 70 of nickel metal were prepared in the same manner as in the foregoing embodiment. The positive current collector 60 was welded at its disc portion 61 to an upper side edge of the ribbon-like sheet metal 23 of the nickel positive electrode 20a, while the negative current collector 70 was welded to a bottom end 41 of negative electrode 40 in the spiraled electrode body A. In this instance, the disc portion 61 of current collector 60 could not be firmly connected to the sheet metal 23 since the welding current was irregularly applied to the upper side edge of sheet metal 23.

After the current collectors 60 and 70 each were welded to the positive and negative electrodes 20a and 40, the spiraled electrode body A was coupled within a bottomed cylindrical casing 80 in the same manner as described above. The negative current collector 70 was welded to the bottom of casing 80, while the cover plate 92 of the closure cap assembly 90 was welded at its bottom surface to the lead portion 62 of positive current collector 60. Thereafter, the casing 80 was filled with electrolyte such as aqueous solution of 30 wt.% potassium hydroxide (KOH) supplied through the center hole 65 of positive current collector 60, and the closure cap assembly 90 was coupled within the opening end 81 of casing 80 through the annular gasket 82 and secured in place by caulking the opening end 81 of casing 80 to seal the interior of casing 80. Thus, a nickel-hydrogen storage battery of nominal capacity 2700 mAH was manufactured by using the nickel positive electrode 20a of the comparative example 1.

c) Nickel-Hydrogen Storage Battery Using the Nickel Positive Electrode of the Comparative Example 2:

The nickel positive electrode 30a was used to manufacture a nickel-hydrogen storage battery in such a manner as described hereinafter. In the manufacturing process of the battery, a negative electrode plate 40 was fabricated by coating a punched sheet metal 41 with a hydrogen storage alloy material, and the nickel positive electrode 30a of the comparative example 2 was spirally rolled up with the negative electrode plate 40 through the separator 50 made of unwoven polypropylene fabric in such a manner that the negative electrode plate 40 is located outside. Thus, a spiraled electrode body A was prepared.

On the other hand, positive and negative current collectors 60 and 70 of nickel metal were prepared as in the foregoing embodiment. After the negative electrode 40 of the spiraled electrode body A was welded at its lower end to the bottom of casing 80 in the same manner as described above, the cover plate 92 of closure cap assembly 90 was welded at its bottom surface to the current collector tab 33 of nickel positive electrode plate 30a. Thereafter, the cylindrical casing 80 was filled with electrolyte such as aqueous solution of 30 wt. % potassium hydroxide (KOH) supplied through the center hole 65 of positive current collector 60, and the closure cap assembly 90 was coupled within the opening end 81 of casing 80 through the annular gasket 82 and secured in place by caulking the opening end 81 of casing 80 to seal the interior of casing 80. Thus, a nickel hydrogen storage battery of nominal capacity 2700 mAH was manufactured by using the nickel positive electrode 30a of the comparative example 2.

3. Result of Experiments a) Defective Rate:

Listed on the following Table 1 is the occurrence rate of defects such as a short-circuit in the batteries during the manufacturing process described above.

TABLE 1

| Kind of electrodes | Example 1 | Example 2 | Example 3 | Comparative Example 1 |
|---|---|---|---|---|
| Occurrence rate of defects | 0.5 | 1.0 | 1.6 | 2.4 |

As shown in Table 1, it has been found that the occurrence rate of defects in the battery manufactured by using the nickel positive electrode 10b of the example 2 is reduced to half in comparison with the occurrence rate of defects in the battery manufactured by using the nickel positive electrode 20a of the comparative example 1. The result was obtained by the facts that the elasticity of the nickel positive electrode 10b was increased by using the punched sheet metal and that the nickel positive electrode 10b was spirally rolled up without causing any separation at the welded portion. It has been also found that the occurrence rate of defects in the battery manufactured by using the nickel positive electrode 10c of the example 3 is reduced less than that in the battery manufactured by using the nickel positive electrode 20a of the comparative example 1. As is understood from the above facts, the punched sheet metal 13, 14 or 15 welded to the upper end portion of the active material retention substrate 10 is useful to reduce the occurrence rate of defects in the batteries.

Although the punched sheet metal 13, 14 or 15 in the foregoing embodiments was formed with circular holes, the sheet metal may be formed with appropriate holes such as triangular holes, rectangular holes, pentagonal holes or the like. In addition, the punched sheet metal may be replaced with an expanded sheet metal.

b) Battery Capacity and Operation Voltage:

Discharge characteristics of the nickel-hydrogen storage batteries manufactured as described above were measured. In the measurement, the nickel-hydrogen storage batteries were discharged respectively at a current of 10 A after fully charged. In this instance, the batteries each were discharged at the current of 10 A until the voltage becomes 1.0 V to measure each discharge capacity of the batteries. In addition, the nickel-hydrogen storage batteries were connected to a load after fully charged and discharged at the current of 10 A until the voltage becomes an intermediate value of 1.00 V to measure each operation voltage of the batteries. A result of the measurement is shown in the following table 2.

TABLE 2

| Kind of electrodes | Discharge capacity (mAh) | Operation voltage (V) |
| --- | --- | --- |
| Example 1 | 2300 | 1.13 |
| Example 2 | 2500 | 1.14 |
| Example 3 | 2600 | 1.15 |
| Comparative Example 1 | 2500 | 1.14 |
| Comparative Example 2 | 200 | 1.03 |

As is understood from the table 2, it has been found that the discharge capacity and operation voltage are increased in accordance with an increase of thickness of the punched sheet metal used respectively for the nickel positive electrodes 10a, 10b and 10c in the examples 1, 2 and 3. In this respect, it is believed that the result of the measurement is obtained by the fact that the voltage drop at the punched sheet metal increases in accordance with a decrease of thickness of the punched sheet metal when the batteries are discharged at the current of 10 A.

It has been also found that in the nickel-hydrogen storage battery using the nickel positive electrode 30a of the comparative example 2, the operation voltage decreases as the discharge capacity is extremely decreased. In this respect, it is believed that the result of the measurement is caused by the fact that the voltage at the current collector tab 33 is extremely decreased when the battery is discharged at the current of 10 A.

Furthermore, it has been found that the discharge capacity and operation voltage of the battery using the nickel positive electrode 10b of the example 2 become substantially equal to those of the battery using the nickel positive electrode 20a of the comparative example 1. However, the sheet metal 23 of the positive electrode 20a may not be thickened since the elasticity of positive electrode 20 is deteriorated. On the other hand, the punched sheet metal 14 of the positive electrode 10b can be thickened without causing any deterioration of its elasticity.

As is understood from the above description, the punched sheet metal 13, 14 or 15 welded to the upper compressed thin portion 12 of the active material retention plate 10 can be spirally rolled up without causing any damage in its structure. As a result, the punched sheet metal 13, 14 or 15 of the spiraled electrode body A can be connected to the positive current collector 60 without causing any short circuit in the battery. This is useful to enhance the discharge capacity and operation voltage of the battery.

Although in the embodiments described above, ultrasonic vibration was applied to the upper end portion of the active material retention plate 10 to remove the active material therefrom, the upper end portion of the active material retention plate 10 may be preliminarily masked with an adhesive tape such as a synthetic adhesive tape prior to impregnation of the active material. In such a case, the adhesive tape is removed after impregnation of the active material, and the punched sheet metal is welded to the upper end portion of the active material retention plate. Alternatively, the punched sheet metal may be welded to the upper end portion of the active material retention plate prior to impregnation of the active material.

In actual practices of the present invention, the negative electrode 41 may be prepared in the same manner as the nickel positive electrode 10a, 10b or 10c and welded to the negative current collector 70 as in the preferred embodiments described above.

What is claimed is:

1. A cylindrical alkaline storage battery including a cylindrical casing, a pair of opposed electrodes spirally rolled up through a separator and coupled within said cylindrical casing, at least one of said electrodes being in the form of a non-sintered electrode composed of an active material retention substrate of three dimensionally meshed structure impregnated with paste of an active material, and a current collector formed with a disc portion for connection to said non-sintered electrode and a lead portion for connection to a terminal, wherein the active material retention substrate of said non-sintered electrode has an elongated end portion at one side thereof for connection to the disc portion of said current collector that is formed so as to be substantially free from said paste of the active material, and wherein a perforated sheet metal is welded to the elongated end portion of said non-sintered electrode and welded at one side edge thereof to the disc portion of said current collector in a condition where said non-sintered electrode has been contained within said cylindrical casing.

2. A cylindrical alkaline storage battery as recited in claim 1, wherein said perforated sheet metal is either one of a punched sheet metal or an expanded sheet metal.

3. A cylindrical alkaline storage battery as recited in claim 2, wherein either one of the punched sheet metal or the expanded sheet metal has a side edge formed by cutting along its perforated portion and welded to the disc portion of said current collector.

* * * * *